United States Patent Office 3,248,440
Patented Apr. 26, 1966

3,248,440
POLYMERIZATION INHIBITOR
Harry Elmer Albert, Lafayette Hill, Pa., assignor to Pennsalt Chemicals Corporation, Philadelphia, Pa., a corporation of Pennsylvania
No Drawing. Filed Oct. 30, 1963, Ser. No. 319,956
14 Claims. (Cl. 260—666.5)

This invention relates to the stabilization of aromatic vinyl compounds and to the stabilized compositions obtained.

It is known that aromatic vinyl compounds such as styrene, divinylbenzene, alpha methyl styrene and the like, tend to polymerize on standing, and numerous inhibitors have been employed heretofore to prevent this premature polymerization. Among the inhibitors previously used have been N,N-dialkylhydroxylamines and their simple inorganic salts, as, for example, the hydrochloride and sulfate, and such technology is taught in U.S. Patents 2,965,685; 2,225,471, and 2,318,212. It has now been found, however, that a surprising improvement in the techniques of stabilizing aromatic vinyl compounds can be achieved by employing as stabilizers N,N-di-lower alkyl hydroxylamine salts of an aliphatic acid containing from 2 to 18 atoms.

It is surprising that only the N,N-dialkylhydroxylamine salts of aliphatic acids are operable as stabilizers. The corresponding aromatic carboxylic acid salts (e.g., benzoates, salicylates, etc.) are inoperable as stabilizers for aromatic vinyl compounds even though they have inherent mutual solubility and compatibility with aromatic vinyl compounds.

It will be understood in discussing this invention that the aliphatic carboxylic acid salts used may be those of any N,N-di-lower-alkyhydroxylamine, i.e., a hydroxylamine having attached to the nitrogen atom two alkyl groups containing from one to 6 carbon atoms; e.g., N,N-dimethylhydroxylamine; N,N-diethylhydroxylamine; N,N-dipropylhydroxylamine; N,N-diisopropylhydroxylamine; N,N-diamylhydroxylamine; N,N-n-propylmethylhydroxylamine; N,N-ethylmethylhydroxylamine; N,N-butylmethylhydroxylamine; N,N-di-hexylhydroxylamine and the like. Likewise, it will be understood that the N,N-dialkylhydroxylamine salts of the invention may be employed with vinyl compounds such as styrene, divinylbenzene, α-methylstyrene, ring methylated styrene, ethylvinylbenzene, vinylnaphthalene, ring chlorinated styrenes, etc., although styrene will be used throughout the specification to illustrate the invention.

The aliphatic carboxylic acid salts of the N,N-dialkylhydroxylamines will, as indicated, be those aliphatic carboxylic acids (e.g., fatty acids) containing from 2 to 18 carbon atoms and will include acetic, propionic, butyric, valeric, hexanoic, octanoic, nonanoic, decanoic, undecanoic, lauric, palmitic, stearic acids, and the like.

When used in the process of the invention to inhibit the premature polymerization of the vinyl compounds, the compounds will be used preferably at a concentration of about 0.1 to 2% by weight of the vinyl compound. However, it is to be understood that lower concentrations may also be employed, as well as higher concentrations, and the general operable range will vary from between about 0.001 to 5% by weight of the vinyl compounds to be stabilized.

The N,N-dialkylhydroxylamine salts of aliphatic acids are prepared as follows:

*N,N-diethylhydroxylamine acetate.*—While stirring and cooling to 10–15° C., 120 g. (2.0 moles) of glacial acetic acid was added dropwise to 192 g. (2.0 moles) of 92.8% N,N-diethylhydroxylamine. The resulting liquid product analyzed 9.28% nitrogen, theoretical value for nitrogen is 9.39%.

*N,N-diethylhydroxylamine stearate.*—A mixture of 92 g. (1.0 mole) of 92.8% N,N-diethylhydroxylamine and 285 g. (1.0 mole) of stearic acid was warmed and stirred at 45–50° C. until all the acid had melted. The resulting product was a liquid which eventually solidified to a light brown solid having a melting point slightly above room temperature.

*N,N-diethylhydroxylamine propionate.*—With stirring, 93 g. (1.25 moles) of propionic acid was added to 126 g. (1.25 moles) of 87.8% N,N-diethylhydroxylamine and then heated for one-half hour at 90–100° C. on a steam bath to yield the product which was a liquid at room temperature.

*N,N-diethylhydroxylamine laurate.*—A mixture of 100 g. (0.5 mole) of purified lauric acid (M.P. 42–43° C.) and 44.5 g. (0.5 mole) of 99.7% N,N-diethylhydroxylamine was warmed in a beaker to 40° C. to completely dissolve the acid. The product was a yellow liquid which assayed 96.98% diethylhydroxylamine laurate by nonaqueous titration with 0.1 N HClO$_4$. It analyzed 4.92% nitrogen; the theoretical value is 4.85% nitrogen.

*N,N-di-n-butylhydroxylamine laurate.*—A mixture of 6.2 g. (0.04 mole) of 92.5% N,N-di-n-butylhydroxylamine and purified lauric acid (M.P. 42–43° C.) was warmed slightly in a beaker until the acid had melted to yield a light brown liquid product.

In order to illustrate the effectiveness of the invention, the following examples are given:

Example 1

The polymerization of styrene containing various N,N-dialkylhydroxylamine salts and a control of styrene containing no inhibitor were compared by means of dilatometric experiments. The dilatometer employed was of the stopcock type with a bulk of 25 ml. capacity and an 80 cm. capillary stem of 2.0 mm. bore. The open capillary top was plugged with a small glass bead to eliminate any evaporation of the monomer. In order to insure that it was free of inhibitor and any impurities, the styrene employed was distilled and maintained under refrigeration prior to polymerization. The styrene charge was drawn into the dilatometer by suction through a tube extending below the bottom of the styrene. The dilatometer was then placed in a mineral oil bath so that the bulb and 5 cm. of the capillary stem were submerged below the oil level. The oil bath was then heated to raise the temperature of the styrene to 120±0.2° C. Approximately 15 minutes were required for the solution to reach thermal equilibrium upon immersion of the dilatometer in the thermostatically-controlled bath.

Initially upon heating, the volume of the styrene in the capillary tube rises to a given level. Thereafter, as polymerization begins and continues, the level of liquid in the capillary tube progressively falls. Thus, the decrease in volume of the liquid in the capillary tube provides a direct measure of the amount of polymerization which is occurring, the smaller the decrease, the greater the inhibition. The following tables indicate the compounds tested and the results obtained.

TABLE.—STABILIZATION EFFECTS OF 0.5% BY WEIGHT OF N,N-DIETHYLHYDROXYLAMINE SALTS ON STYRENE

|  | Decrease in height in 2 hours at 120° C. | |
|---|---|---|
|  | Cm. | Percent of control |
| A | | |
| Control | 26.5 | |
| Diethylhydroxylamine | 4.2 | 15.8 |
| Diethylhydroxylamine acetate | 0.7 | 2.6 |
| B | | |
| Control | 31.3 | |
| Diethylhydroxylamine | 2.3 | 7.35 |
| Diethylhydroxylamine propionate | 0.7 | 2.10 |
| C | | |
| Control | 39.8 | |
| Diethylhydroxylamine | 6.2 | 15.6 |
| Diethylhydroxylamine hydrochloride | 7.0 | 17.6 |
| Diethylhydroxylamine benzoate | 30.0 | 75.4 |
| Diethylhydroxylamine salicylate | 18.2 | 45.7 |
| Diethylhydroxylamine stearate | 1.7 | 4.3 |

It is evident from the above Table I that the aliphatic acid salts of diethylhydroxylamine are markedly superior polymerization inhibitors to the diethylhydroxylamine, its hydrochloride, or its aromatic carboxylic acid salts.

*Example 2*

The evaluation procedure of Example 1 was repeated using diethylhydroxylamine acetate at a concentration of 0.1% by weight of the styrene. The polymerization of the styrene was greatly inhibited, proceeding only to 6% of that obtained without the inhibitor.

*Example 3*

Evaluation of the two lauric acid salts at 0.1% concentration in accord with the procedure of Example 1 gave the following results:

| Compound | Decrease in height in 2 hrs. at 120° C. | |
|---|---|---|
|  | Cm. | Percent of control |
| Control | 71.0 | |
| N,N-diethylhydroxylamine laurate | 7.8 | 11.0 |
| N,N-di-n-butylhydroxylamine laurate | 3.3 | 4.6 |

In using the stabilizers in accordance with the present invention, the N,N-di-lower alkylhydroxylamine may be first dissolved in uninhibited styrene to prepare a stock solution. Aliquots of this stock solution are then used as an additive to the styrene to be stabilized. In this way, the stabilizers are easily handled, stored, and transported.

It will be understood that numerous changes and variations may be made from the above description and examples without departing from the spirit and scope of the invention.

I claim:

1. The process of stabilizing an aromatic vinyl compound against polymerization which comprises incorporating in said vinyl compound a polymerization inhibiting amounts of an N,N-di-lower alkylhydroxylamine salt wherein said salt is derived from an aliphatic acid containing from two to eighteen carbon atoms.

2. The process of stabilizing styrene against polymerization which comprises incorporating in said styrene from 0.001% to 5.0% by weight of styrene of an N,N-di-lower alkylhydroxylamine salt wherein said salt is derived from an aliphatic acid containing from two to eighteen carbon atoms.

3. The process of claim 2 wherein the stabilizer is N,N-di-ethylhydroxylamine acetate.

4. The process of claim 2 wherein the stabilizer is N,N-diethylhydroxylamine propionate.

5. The process of claim 2 wherein the stabilizer is N,N-diethylhydroxylamine stearate.

6. The process of claim 2 wherein the stabilizer is N,N-diethylhydroxylamine laurate.

7. The process of claim 2 wherein the stabilizer is N,N-di-n-butylhydroxylamine laurate.

8. A composition comprising an aromatic vinyl compound containing a polymerization inhibiting amount of an N,N-di-lower alkylhydroxylamine salt wherein said salt is derived from an aliphatic acid containing from two to eighteen carbon atoms.

9. A composition comprising styrene containing from 0.1% to 2.0% by weight of styrene of an N,N-di-lower alkylhydroxylamine salt wherein said salt is derived from an aliphatic acid containing from two to eighteen carbon atoms.

10. A composition comprising styrene and an amount of N,N-di-ethylhydroxylamine acetate sufficient to inhibit polymerization.

11. A composition comprising styrene and an amount of N,N-di-ethylhydroxylamine propionate sufficient to inhibit polymerization.

12. A composition comprising styrene and an amount of N,N-diethylhydroxylamine stearate sufficient to inhibit polymerization.

13. A composition comprising styrene and an amount of N,N-di-ethylhydroxylamine laurate sufficient to inhibit polymerization.

14. A composition comprising styrene and an amount of N,N-di-n-butylhydroxylamine laurate sufficient to inhibit polymerization.

References Cited by the Examiner

UNITED STATES PATENTS 2,830,033  4/1958  Beaver _____ 260—45.9
2,965,685  12/1960  Campbell _____ 260—666.5

DELBERT E. GANTZ, *Primary Examiner.*

S. P. JONES, *Examiner.*